US009320012B2

(12) United States Patent
Shibayama et al.

(10) Patent No.: US 9,320,012 B2
(45) Date of Patent: Apr. 19, 2016

(54) INFORMATION PROCESSING APPARATUS, COMPUTER-READABLE MEDIUM, AND METHOD

(71) Applicant: SoftBank Corp., Tokyo (JP)

(72) Inventors: Kazuhisa Shibayama, Kanagawa (JP); Hirofusa Watamori, Kanagawa (JP); Toshiaki Semba, Kanagawa (JP); Naomi Saeki, Tokyo (JP); Yudai Sekiya, Kanagawa (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 14/794,810

(22) Filed: Jul. 9, 2015

(65) Prior Publication Data

US 2015/0312880 A1     Oct. 29, 2015

Related U.S. Application Data

(63) Continuation of application No. PCT/JP2013/006938, filed on Nov. 26, 2013.

(30) Foreign Application Priority Data

Jan. 11, 2013    (JP) ................................. 2013-003731
May 21, 2013    (JP) ................................. 2013-107325

(51) Int. Cl.
*H04W 64/00*      (2009.01)
*G08C 17/02*      (2006.01)
*H04W 88/06*      (2009.01)

(52) U.S. Cl.
CPC ............ *H04W 64/003* (2013.01); *G08C 17/02* (2013.01); *G08C 2201/112* (2013.01); *H04W 64/00* (2013.01); *H04W 88/06* (2013.01)

(58) Field of Classification Search
CPC ............ G08C 17/02; G08C 2201/112; G08C 2201/114; H04W 64/003; H04W 88/06
See application file for complete search history.

(56) References Cited

U.S. PATENT DOCUMENTS

2012/0113837 A1*   5/2012   Siomina ................ H04W 24/10
                                                            370/252
2013/0005356 A1*   1/2013   Kobayashi ............ G01S 5/0027
                                                            455/456.1

FOREIGN PATENT DOCUMENTS

| JP | 2003-249887 A | 9/2003 |
| JP | 2008-160754 A | 7/2008 |
| JP | 2013-034103 A | 2/2013 |
| WO | 2009/011064 A1 | 1/2009 |

OTHER PUBLICATIONS

International Search Report for International Application No. PCT/JP2013/006938, issued by the Japan Patent Office on Mar. 4, 2014.
International Preliminary Report on Patentability for International Application No. PCT/JP2013/006938, issued by the International Bureau of WIPO on Jul. 23, 2015.

* cited by examiner

*Primary Examiner* — Kashif Siddiqui

(57) ABSTRACT

In order to know a communication state similar to an actual usage state of a user over a wide area, provided is an information processing apparatus that sends and receives information to and from a communication terminal via a network. The information processing apparatus includes a log information acquiring section that acquires, from the communication terminal, one or more pieces of log information in which position information identifying each of one or more positions and information relating to a communication environment of the communication terminal at each of the one or more positions are associated with each other; and a statistical information generating section that generates statistical information relating to the communication environment at a position, based on the one or more pieces of log information.

20 Claims, 6 Drawing Sheets

| 300 | | | | | | | | | |
|---|---|---|---|---|---|---|---|---|---|
| 310 | 320 | 330 | 340 | 350 COMMUNICATION ENVIRONMENT INFORMATION | | | | 360 TERMINAL INFORMATION | |
| TERMINAL ID | DATE AND TIME | POSITION INFORMATION | GPS ACCURACY | COMMUNICATION POSSIBILITY | THROUGHPUT | LATENCY | COMMUNICATION METHOD | MODEL NAME | OS INFORMATION |
| 0001 | 2012/12/10 ... | *** | *** | *** | *** | *** | *** | *** | *** |
| 0001 | 2012/12/10 ... | *** | *** | *** | *** | *** | *** | *** | *** |
| 0001 | 2012/12/10 ... | *** | *** | *** | *** | *** | *** | *** | *** |
| ... | ... | ... | ... | ... | ... | ... | ... | ... | ... |
| 0002 | 2012/12/11 ... | *** | *** | *** | *** | *** | *** | *** | *** |
| 0002 | 2012/12/11 ... | *** | *** | *** | *** | *** | *** | *** | *** |
| ... | ... | ... | ... | ... | ... | ... | ... | ... | ... |
| 0003 | 2012/12/12 ... | *** | *** | *** | *** | *** | *** | *** | *** |
| | | | | 352 | 354 | 356 | 358 | 362 | 364 |

| MODEL NAME | COMPATIBLE COMMUNICATION METHODS |
|---|---|
| S0001 | 3G (2.1GHz BAND) |
| S0002 | 3G (900MHz BAND); 3G (2.1GHz BAND); LTE (900MHz BAND); LTE (2.1GHz BAND); WiFi (2.4GHz BAND) |
| : | : |
| A0001 | 3G (800MHz BAND); 3G (2.1GHz BAND); LTE (800MHz BAND); LTE (2.1GHz BAND); WiMAX (2.5GHz BAND) |
| : | : |

FIG. 6

INFORMATION PROCESSING APPARATUS, COMPUTER-READABLE MEDIUM, AND METHOD

The contents of the following Japanese patent applications and PCT application are incorporated herein by reference:
NO. 2013-003731 filed on Jan. 11, 2013,
NO. 2013-107325 filed on May 21, 2013, and
NO. PCT/JP2013/006938 filed on Dec. 26, 2013.

BACKGROUND

1. Technical Field

The present invention relates to an information processing apparatus, program, and method.

2. Related Art

Technology is known that includes using a wireless communication terminal such as a mobile phone to measure the line speed of a mobile communication network, such as shown in Patent Document 1, for example.

PRIOR ART DOCUMENTS

Patent Documents

Patent Document 1: Japanese Patent Application Publication No. 2003-249887

SUMMARY OF THE INVENTION

Problem to be Solved by the Invention

With the measurement method described above, the line speed is measure at the specific time and place at which the user accesses the server. However, it is impossible to know a communication state similar to the actual usage state of the user over a wide area. Furthermore, it is difficult to know the change over time of the communication state, for example. Therefore, it is an object of an aspect of the innovations herein to provide an information processing apparatus, program, and method, which are capable of overcoming the above drawbacks accompanying the related art. The above and other objects can be achieved by combinations described in the claims.

Means for Solving the Problem

According to a first aspect of the present invention, provided is an information processing apparatus that sends and receives information to and from a communication terminal via a network. The information processing apparatus comprises a log information acquiring section that acquires, from the communication terminal, one or more pieces of log information in which position information identifying each of one or more positions and information relating to a communication environment of the communication terminal at each of the one or more positions are associated with each other; and a statistical information generating section that generates statistical information relating to the communication environment at a position, based on the one or more pieces of log information.

According to a second aspect of the present invention, provided is an information processing apparatus that sends and receives information to and from a communication terminal via a network. The information processing apparatus comprises a log information acquiring section that acquires, from the communication terminal, one or more pieces of log information in which position information identifying each of one or more positions, information relating to a communication environment of the communication terminal at each of the one or more positions, acquisition time information relating to a time at which the information relating to the communication environment was acquired, and terminal identification information identifying the communication terminal are associated with each other; a log information classifying section that classifies the one or more pieces of log information into one or more groups, based on the position information and the acquisition time information; a representative value generating section that, for each of the one or more groups, generates a representative value that represents information relating to the communication environment of the group, based on the log information included in the group; and a statistical information generating section that generates statistical information relating to the communication environment at a position, based on representative value of each of the one or more groups.

According to a third aspect of the present invention, provided is an information processing apparatus that sends and receives information to and from a communication terminal via a network. The information processing apparatus comprises a log information acquiring section that acquires, from the communication terminal, one or more pieces of log information in which position information identifying each of one or more positions and information relating to a communication environment of the communication terminal at each of the one or more positions are associated with each other; a communication method determining section that determines a communication method used when acquiring the information relating to the communication environment, for each of the one or more pieces of log information; and a statistical information generating section that generates statistical information relating to the communication environment at a position for at least a communication method designated by a user of the information processing apparatus, based on each of the one or more pieces of log information. The information relating to the communication environment includes information relating to latency of the network, and the communication method determining section determines the communication method based on the information relating to the latency.

According to a fourth aspect of the present invention, provided is a program that causes a computer to function as any one of the information processing apparatuses described above.

According to a fifth aspect of the present invention, provided is a method comprising acquiring, from a communication terminal connected via a network, one or more pieces of log information in which position information identifying each of one or more positions and information relating to a communication environment of the communication terminal at each of the one or more positions are associated with each other; and generating statistical information relating to the communication environment at a position, based on the one or more pieces of log information.

The summary clause does not necessarily describe all necessary features of the embodiments of the present invention. The present invention may also be a sub-combination of the features described above.

BRIEF DESCRIPTION OF THE DRAWINGS

FIG. 3 is a schematic view of an exemplary data table 300.

FIG. 6 is a schematic view of an exemplary data table 600.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
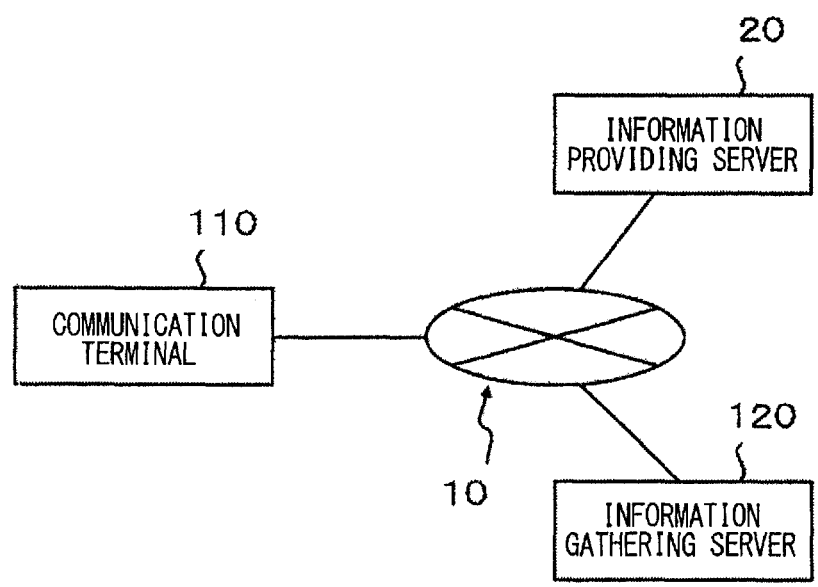
FIG. 1 is a schematic view of an exemplary communication state analyzing system 100.

FIG. 1 is a schematic view of an exemplary communication state analyzing system 100. In the present embodiment, the communication state analyzing system 100 includes a communication terminal 110 and an information gathering server 120. The communication state analyzing system 100 and the information gathering server 120 are an example of an information processing apparatus. The communication state analyzing system 100 may include a plurality of communication terminals 110, and the information providing server 20 and information gathering server 120 may send and receive information to and from one or more communication terminals 110.

The communication terminal 110 and the information gathering server 120 send and receive information through the communication network 10. The communication terminal 110 and the information providing server 20 send and receive information through the communication network 10. The communication network 10 may be a transmission path for wireless communication, or may be a combination of a transmission path for wireless communication and a communication path for wired communication. The communication network 10 may be a dedicated line and the Internet, a wireless packet network, or a mobile communication network such as a mobile phone line network, or may be a combination of these networks.

The information providing server 20 and the information gathering server 120 may each be realized by activating software that defines the operation of each component of the information providing server 20 and the information gathering server 120 by an information processing apparatus having a standard configuration. The information processing apparatuses used as the information providing server 20 and the information gathering server 120 may each include a data processing apparatus having a CPU, ROM, RAM, a communication interface, and the like; an input apparatus such as a keyboard, a touch panel, or a microphone; an output apparatus such as a display apparatus or a speaker, and a storage apparatus such as a memory or an HDD.

The information providing server 20 and the information gathering server 120 may each be a virtual server or a cloud system. Each function of the information providing server 20 and the information gathering server 120 may be realized by a plurality of servers.

The information providing server 20 provides a service to a user of the communication terminal 110, by providing information to the communication terminal 110 via the communication network 10. The service provided by the information providing server 20 can be exemplified by an information search service, a geographical navigation service, a mail service, an audio and/or video data distribution service, or an electronic book distribution service. The information providing server 20 receives from the communication terminal 110 a transmission request concerning information designated by the user of the communication terminal 110. The information providing server 20 transmits the information to the communication terminal 110 in response to the transmission request from the communication terminal 110.

The communication terminal 110 has a communication function. The communication terminal 110 may have a wireless communication function. The communication terminal 110 may be compatible with a plurality of communication methods. For example, the communication terminal 110 may be compatible with both a mobile communication method such as 3G, LTE, or 4G and a wireless communication method such as WiFi (Registered Trademark) or WiMAX (Registered Trademark). The communication terminal 110 may be any apparatus that can send and receive information to and from the information providing server 20 and the information gathering server 120, and may be an apparatus such as a personal computer, mobile phone, mobile terminal (e.g. a PDA, tablet, notebook, or laptop computer), or wireless terminal that includes a web browser.

The communication terminal 110 may be realized by activating software or a program that defines the operation of each component of the communication terminal 110 with an information processing apparatus having a standard configuration. The information processing apparatus used as the communication terminal 110 may include a data processing apparatus having a CPU, ROM, RAM, a communication interface, and the like; an input apparatus such as a keyboard, a touch panel, a microphone, a GPS information acquiring apparatus, an acceleration sensor, or a gyro sensor; an output apparatus such as a display apparatus or a speaker, and a storage apparatus such as a memory or an HDD.

The communication terminal 110 receives user instructions and performs a process designated by the user instructions. The user instructions may be instructions that instruct the communication terminal 110 to perform a process other than a process for acquiring information relating to the communication environment. When the user instructions are received, the communication terminal 110 acquires information relating to the communication environment of the communication terminal 110 (sometimes referred to as "communication environment information") and position information indicating the position at which the communication environment information is acquired. When performing the processes designated by the user instructions, the communication terminal 110 may acquire the communication environment information and the position information. The position information may be information relating to longitude and latitude, and may further include information relating to altitude. The communication terminal 110 transmits to the information gathering server 120 information in which at least the communication environment information and the position information are associated with each other (sometimes referred to as "log information").

The communication environment information can be exemplified by information relating to the possibility of communication, the radio wave state (e.g. the radio wave reception level, radio wave strength, or RSCP (Received Signal Code Power)), communication quality (e.g. communication speed, data communication throughput, data communication latency, or CID (Cell ID)), the communication method, or the communication carrier. The communication environment information may include information other than the information relating to the radio waves, such as information relating to a network. The possibility of communication refers to determining that communication is not possible (sometimes referred to as "communication impossible") when the radio wave reception level is less than a predetermined level, e.g. when the apparatus is outside the coverage area.

The communication terminal 110 generates information in which at least the communication environment information and the position information are associated with each other (sometimes referred to as "log information"). In this way, it is possible to associate the pieces of position information identifying one or more positions with the pieces of information relating to the communication environment of the communication terminal at these positions. The communication terminal 110 transmits the log information to the information gathering server 120.

The log information is information in which are associated the communication environment information, the position information, and at least one of information indicating the time at which the communication environment information was acquired, information indicating the GPS accuracy at the time the position information was acquired, and information relating to the communication terminal 110. The information relating to the communication terminal 110 can be exemplified by terminal identification information that identifies each communication terminal 110, information indicating the model of the communication terminal 110, and information indicating the OS of the communication terminal 110. The information indicating the time at which the communication environment information was acquired may be the time at which the communication terminal 110 begins the process to acquire the communication environment information, the time at which the communication terminal 110 ends the process of acquiring the communication environment information, or the time at which the communication terminal 110 receives the user instructions. The terminal identification information is an example of identification information for identifying a computer.

The terminal identification information is not particularly limited, as long as this information enables identification of each communication terminal 110, but is preferably information that enables identification of a communication terminal 110 without identifying the user of the communication terminal 110. In this way, the information gathering server 120 can analyze the log information by referencing the temporal correlation of the log information, without identifying the user of the communication terminal 110.

For example, a randomly selected code sequence is set as the terminal identification information for a prescribed communication terminal 110. The code sequence may be unique for each of the one or more communication terminals 110, or may be reused among a plurality of communication terminals 110. The terminal identification information may be updated at predetermined intervals, or may be updated at a desired timing.

The information gathering server 120 acquires one or more pieces of log information from the one or more communication terminals 110. The information gathering server 120 may store the acquired log information in the storage apparatus. The information gathering server 120 may analyze the log information and generate information relating to the communication state for at least some of the one or more positions. The information gathering server 120 may analyze the log information and distinguish between log information indicating a communication environment that is indoors and log information indicating a communication environment that is outdoors.

The information relating to the communication state may be statistical information relating to the communication environment at a position. The statistical information may be information relating to at least one of a temporal trend and a geographical trend in the information relating to the communication environment. The statistical information may be the change over time of the communication possibility or communication quality at a single position or within a single geographical range (sometimes referred to as an "area"). The statistical information may be a calculation result of the communication possibility or communication quality at a single position or in a single area.

In one embodiment, the information gathering server 120 analyzes the log information and generates information relating to each of an area in which the log information indicating that communication is impossible decreases, an area in which the log information indicating that communication is impossible increases, and an area in which the log information indicating that communication is impossible neither increases nor decreases near the position of a newly installed base station, before and after the base station is installed. In another embodiment, the information gathering server 120 analyzes the log information and generates information comparing the communication quality in a prescribed area to the communication quality in another area. The prescribed area can be exemplified by the region around a railroad station, the region around an office district, or the region around large-scale customer facilities. With yet another embodiment, the information gathering server 120 analyzes the log information and generates information indicating the frequency at which information indicating that communication is impossible occurs during different time periods.

Figure 2:
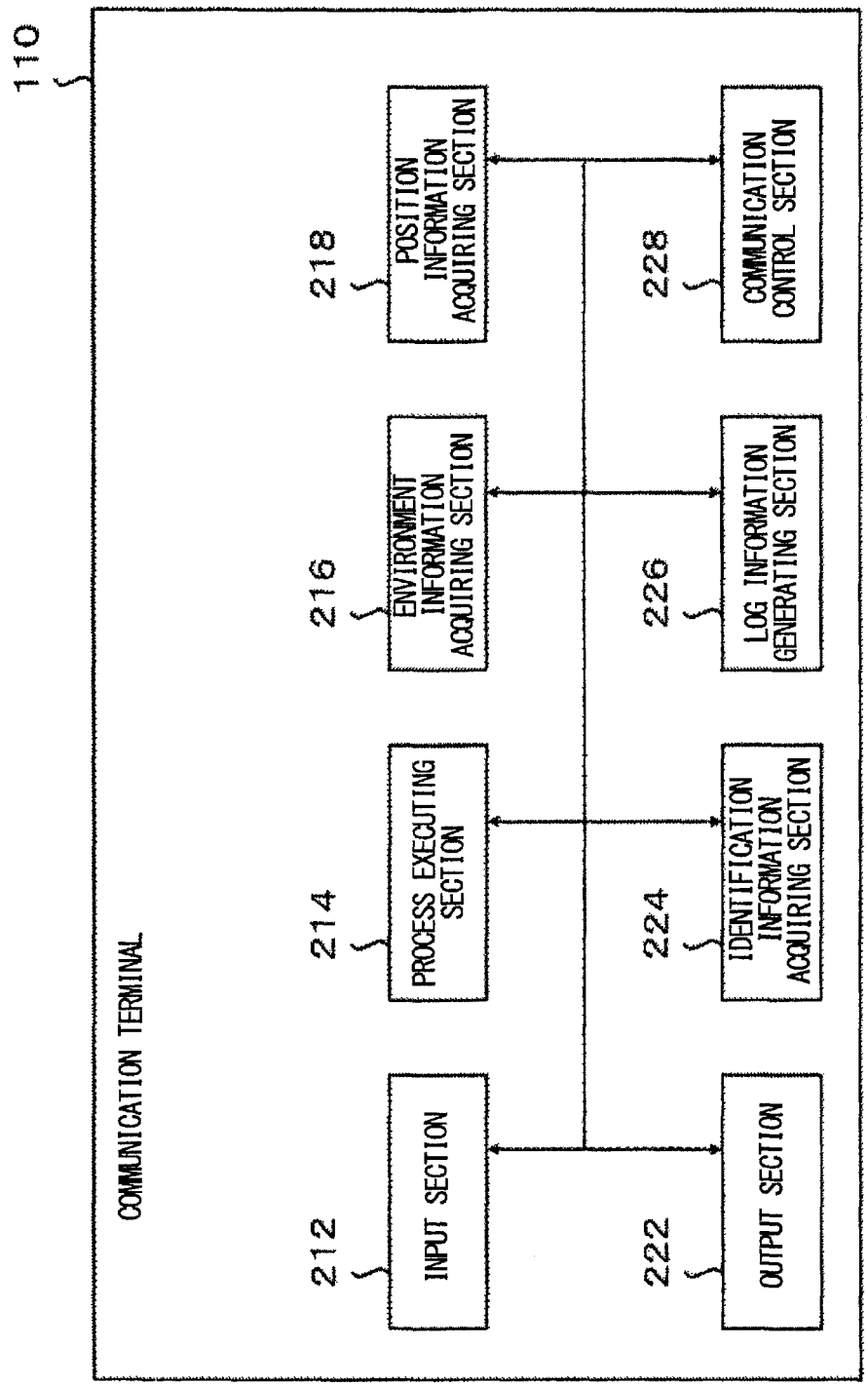
FIG. 2 is a schematic view of an exemplary communication terminal 110.

FIG. 2 is a schematic view of an exemplary function block configuration of the communication terminal 110. In the description relating to FIG. 2, portions identical to the description provided in relation to FIG. 1 may be omitted. In the present embodiment, the communication terminal 110 includes an input section 212, a process executing section 214, an environment information acquiring section 216, a position information acquiring section 218, an output section 222, an identification information acquiring section 224, a log information generating section 226, and a communication control section 228. Each component of the communication terminal 110 sends and receives information to and from the other components.

Each component of the communication terminal 110 may be realized by hardware, by software, or by a combination of hardware and software. By executing a program, a computer may function as a portion of the communication terminal 110. The program may be stored on a computer readable medium, or may be stored in a storage apparatus connected to a network.

The program that is installed on the computer and causes the computer to function as a portion of the communication terminal 110 according to the present embodiment includes modules that define the operations of each component of the communication terminal 110. This program and these modules cause the CPU or the like to cause the computer to function as each component of the communication terminal 110. The information processes recorded in the program are read by the computer, thereby causing the computer to function as specific means utilizing cooperation between software and the various hardware resources of the communication terminal 110. The specific means can form the communication terminal 110 suitable for an intended use, by realizing computation and processing of information according to the intended use of the computer according to the present embodiment.

The input section 212 receives the user instructions from the user of the communication terminal 110. The user instructions instruct the communication terminal 110 to perform a process other than the process for acquiring information relating to the communication environment. Accordingly, the user instructions do not include instructions exclusively requesting the acquisition of information for measuring the line speed or communication speed, instructions exclusively requesting access to the server providing a service of measuring the line speed or communication speed, or the like. The input section 212 may be a keyboard, touch panel, or microphone. The input section 212 is an example of a user request receiving section.

The process executing section 214 performs the process designated by the user instructions. The process designated by the user instructions may be a process that uses the communication function or a process that does not use the communication function.

The process designated by the user instructions may be a process that is performed at the time when the communication terminal 110 receives the user instructions. The process designated by the user instructions may be a process that is performed automatically at a predetermined time or every time that a predetermined amount of time has passed according to a setting made by the user, or may be a program that is performed automatically at a predetermined time or every time that a predetermined amount of time has passed according to an initial setting of the communication terminal 110 or an initial setting of a program running on the communication terminal 110.

The process designated by the user instructions may be a process to output information designated by the user instructions in a format that can be recognized by the user of the communication terminal 110. Such a process can be exemplified by a process for scrolling through a display screen of the communication terminal 110 to change the display position of an image displayed in the display screen or a process to access the information providing server 20, acquire information designated by the user of the communication terminal 110 from the information providing server 20, and display the acquired information on a display screen of the communication terminal 110.

The process designated by the user instructions may be a process associated with the pressing of a button or the switching of a switch of the communication terminal 110. The process designated by the user instructions may be a process to turn OFF the power supply of the communication terminal 110. The process designated by the user instructions may be a process to log off from the communication terminal 110, or a process to put the communication terminal 110 into a sleep state.

When the user instructions are received, the environment information acquiring section 216 acquires the communication environment information of the communication terminal 110 separately from the process designated by the user instructions. When the process executing section 214 performs the process designated by the user instructions, the environment information acquiring section 216 may acquire the communication environment information separately from the process designated by the user instructions. The environment information acquiring section 216 may acquire the communication environment information at a predetermined time or every time that a predetermined amount of time has passed (sometimes referred to as the "communication environment information acquisition time").

In one embodiment, when the input section 212 receives user instructions designating activation of a GPS logger, the environment information acquiring section 216 acquires the communication environment information every time the GPS logger acquires the log information at prescribed time intervals. In another embodiment, when the input section 212 receives user instructions designating activation of mail software, the environment information acquiring section 216 acquires the communication environment information every time the mail software accesses the mail server in the background. In yet another embodiment, when the input section 212 receives user instructions designating a setting of a wakeup function, the environment information acquiring section 216 acquires the communication environment information at the time when the wakeup function is set or the time when the wakeup function is activated.

The environment information acquiring section 216 may acquire the communication environment information based on the time from when the request for transmitting the information designated by the user of the communication terminal 110 is made to the information providing server 20 to when this information is acquired from the information providing server 20 and on the amount of this information. The process for acquiring the communication environment information may be performed in the background.

In this way, the communication environment information can be acquired while the user of the communication terminal 110 is manipulating the communication terminal 110. Furthermore, the communication environment information can be acquired even when the communication terminal 110 is performing processes that do not use the communication function. Yet further, the communication environment information can be acquired without the user of the communication terminal 110 performing a specialized manipulation to acquire the communication environment information. As a result, it is possible to know the communication state that is similar to the actual usage condition of the user of the communication terminal 110 over a wide area. Furthermore, it is possible to know the change over time of the communication state.

When the user instructions are received, the position information acquiring section 218 acquires the position information of the communication terminal 110 separately from the process designated by the user instructions. When the process executing section 214 performs the process designated by the user instructions, the position information acquiring section 218 may acquire the position information separately from the process designated by the user instructions. When the environment information acquiring section 216 acquires the communication environment information, the position information acquiring section 218 may acquire the position information. In this way, the communication environment information can be associated with the position information. The process for acquiring the position information may be performed in the background.

The position information acquiring section 218 may acquire the position information based on at least one of GPS information and radio wave information from an access point in a wireless communication network or mobile communication network. The position information acquiring section 218 may be a GPS information acquisition apparatus, or may acquire the position information from a GPS information acquisition apparatus arranged in the communication terminal 110. The position information acquiring section 218 may acquire information relating to the GPS accuracy along with the position information.

The output section 222 outputs the information designated by the user instructions in a format that can be recognized by the user of the communication terminal 110. The output section 222 may be a display apparatus such as a liquid crystal display or an organic EL display, an audio output device such as a speaker, or a vibration apparatus such as a vibrator.

As an example, the output section 222 displays an image on a screen and changes the display position of the image displayed on the screen, according to the instructions from the user of the communication terminal 110. The output section 222 may display the image based on information acquired from the information providing server 20 via the communication network 10 or information stored in the storage apparatus of the communication terminal 110. The output section 222 may output the information acquired from the information providing server 20 via the communication network 10 or information stored in the storage apparatus of the communication terminal 110 as audio information through the speaker. In this way, the user of the communication terminal 110 can recognize the information.

On the other hand, when a prescribed process is performed in the background, the information used for this process is not output from the output section 222 in a format that can be sensed by the user of the communication terminal 110. Therefore, the user of the communication terminal 110 cannot sense this information.

The identification information acquiring section 224 acquires the terminal identification information for identifying each communication terminal 110. The identification information acquiring section 224 may generate terminal identification information corresponding to each of the communication terminals 110, or may receive the terminal identification information from the information gathering server 120. The terminal identification information is determined randomly by using random numbers, for example. The terminal identification information may be updated at a predetermined time or every time a predetermined amount of time has passed. The identification information acquiring section 224 may acquire information relating to each communication terminal 110, such as information indicating the model of the communication terminal 110 and information indicating the OS of the communication terminal 110.

The log information generating section 226 acquires the communication environment information from the environment information acquiring section 216. The log information generating section 226 may acquire from the environment information acquiring section 216 information indicating the time at which the communication environment information was acquired. The log information generating section 226 acquires from the position information acquiring section 218 the position information indicating the position at which the communication environment information was acquired. The log information generating section 226 may acquire from the position information acquiring section 218 information relating to the GPS accuracy at the time when the position information was acquired. The log information generating section 226 may acquire the terminal identification information from the identification information acquiring section 224.

The log information generating section 226 generates one or more pieces of log information. The log information generating section 226 generates the log information in association with at least the communication environment information and the position information. The log information generating section 226 may generate the log information in association with the communication environment information, the position information, and at least one of information indicating the time at which the communication environment information was acquired, information indicating the GPS accuracy at the time when the position information was acquired, and information relating to the communication terminal 110. The process for generating the log information may be performed in the background.

The log information generating section 226 may determine the communication method used when the communication environment information was acquired, based on the information relating to the data communication latency included in the communication environment information. For example, when the latency is less than a predetermined value, the log information generating section 226 determines that the communication environment information acquired by the environment information acquiring section 216 is information acquired when the communication terminal 110 performs communication using a first communication method. The first communication method can be exemplified by LTE or 4G. On the other hand, when the latency is greater than or equal to the predetermined value, the log information generating section 226 determines that the communication environment information acquired by the environment information acquiring section 216 is information acquired when the communication terminal 110 performs communication using a second communication method. The second communication method can be exemplified by 3G. The log information generating section 226 may generate the log information in association with the information relating to the communication method used when the communication environment information is acquired, the communication environment information, and the position information.

The log information generating section 226 may acquire an internal mathematical function in the OS running on the communication terminal 110. The log information generating section 226 may determine the communication method used when the communication environment information is acquired, based on the acquired internal mathematical function.

The log information generating section 226 may generate the log information every time the input section 212 receives user instructions. The log information generating section 226 may generate the log information every time the process designated by the user instructions is performed. The log information generating section 226 may generate the log information at a predetermined time or every time a predetermined amount of time has passed (sometimes referred to as the "log information generation time"). The log information generation time may be approximately the same as the communication environment information acquisition time, or may be different.

The log information generating section 226 may transmit the generated log information to the information gathering server 120. The log information generating section 226 may transmit the log information to the information gathering server 120 every time the log information is generated. The log information generating section 226 may transmit the generated log information to the information gathering server 120 at a predetermined time or every time a predetermined amount of time has passed (sometimes referred to as the "log information transmission time"). The log information transmission time may be approximately the same as the log information generation time, or may be different.

The log information generating section 226 may transmit the generated log information to the information gathering server 120 at least at one of the timing at which the communication terminal 110 is activated, the timing at which the communication terminal 110 recovers from a sleep state, and a timing at which the program causing the computer to function as a portion of the communication terminal 110 is activated. The log information generating section 226 may store the generated log information during a period from when the log information is transmitted to when subsequent log information is transmitted.

The communication control section 228 controls the communication between the communication terminal 110, the communication network 10, the information providing server 20, and the information gathering server 120. The communication control section 228 may be a communication interface. The communication control section 228 may be compatible with a plurality of communication methods.

The present embodiment described an example in which the information gathering server 120 is a different server than the information providing server 20 and the communication terminal 110 transmits the communication environment information to the information gathering server 120. However, the communication state analyzing system 100 is not limited to this embodiment. In another embodiment, the communication terminal 110 transmits the communication environment information to the information providing server 20. The information providing server 20 stores the communication environment information received from the communication terminal 110 in the storage apparatus. The information gathering server 120 analyzes the communication state based on the communication environment information stored in the information providing server 20. The functions of each component of the communication terminal 110 are not strictly separated, and the functions of each component of the communication terminal 110 are not limited to those described in the present embodiment.

The present embodiment describes an example in which, when user instructions are received that designate execution of a process other than the process for acquiring the information relating to the communication environment, the communication terminal 110 knows the communication state similar to the actual usage state of the user of the communication terminal 110 over a wide area by acquiring the communication environment information and the position information. However, the method of knowing the communication state similar to the actual usage state of the user of the communication terminal 110 over a wide area is not limited to the embodiment described above.

In another embodiment, the communication terminal 110 may receive input from the user of the communication terminal 110 designating the start of a process, and then automatically acquire the information relating to the communication environment at a prescribed time or every time that a prescribed amount of time has passed. The user of the communication terminal 110 need not perform a manipulation for acquiring the communication environment information every time the communication environment information is to be acquired, and therefore it is possible to know the communication state similar to the actual usage state of the user of the communication terminal 110 over a wide area. Furthermore, it is possible to know that change over time of the communication state.

In this case, the communication terminal 110 may transmit the communication environment information to the information gathering server 120 every time the communication environment information is acquired. The communication terminal 110 may store the acquired communication environment information, and transmit the stored communication environment information to the information gathering server 120 according to predetermined conditions. The predetermined conditions can be exemplified by the number of acquisitions of the communication environment information reaching a predetermined number, the information amount of the stored communication environment information reaching a predetermined capacity, a predetermined time being reached, or a predetermined amount of time passing. If the communication terminal 110 cannot perform communication at the timing when the communication environment information is to be sent to the information gathering server 120, the communication terminal 110 may store the acquired communication environment information without performing transmission and then transmit the communication environment information at the next transmission timing.

FIG. 3 is a schematic view of an exemplary data table 300 for the log information. The data table 300 shows a plurality of pieces of log information generated by one communication terminal 110. The information stored in each row of the data table 300 is an example of the log information.

The data table 300 includes a terminal ID 310, information relating to the date and time 320 at which the communication environment information was acquired, position information 330 indicating the position at which the communication environment information was acquired, information relating to the GPS accuracy 340 at the time when the position information 330 was acquired, communication environment information 350, and terminal information 360 stored in association with each other. The communication environment information 350 may include information relating to the communication possibility 352, information relating to the throughput 354 of the data communication, information relating to the latency 356 of the data communication, and information relating to the communication method 358 used when acquiring the communication environment information 350. The terminal information 360 may include a model name 362 and OS information 364.

The terminal ID 310 is an example of the terminal identification information. The model name 362 is an example of model identification information. The OS information 364 is an example of information relating to the name and version of the OS. At least one of the terminal ID 310 and the model name 362 is an example of information for identifying the model of the communication terminal 110 used when acquiring the communication environment information 350.

In a case where the information gathering server 120 stores the terminal ID 310 and the model name 362 in association with each other, the information gathering server 120 can identify the model of the communication terminal used when acquiring the information relating to the communication environment, based on the terminal ID 310. The case where the information gathering server 120 stored the terminal ID 310 and the model name 362 in association with each other can be exemplified by a case in which the communication terminal 110 transmits to the information gathering server 120 information associating the terminal ID 310 and the model name 362 or a case where the terminal ID 310 and the model name 362 are stored in association which each other when the information gathering server 120 generates the terminal ID 310.

In the present embodiment, the terminal ID 310 is a randomly selected code sequence, and is updated every two days. In this way, the information gathering server 120 can analyze the log information by referencing the temporal relationship in the log information, without identifying the user of the communication terminal 110. The information gathering server 120 may determine a characteristic of the user of the communication terminal 110, for example, by analyzing the log information.

More specifically, the information gathering server 120 attaches information indicating a characteristic of the log information to each of the one or more pieces of log information. For example, for each prescribed area, the information gathering server 120 stores in advance the position information indicating the range of the area and a characteristic of the area, in association with each other. The information gathering server 120 references the information stored in advance and, based on the position information included in the log information, attaches a characteristic of the area corresponding to the position indicated by the position information, as the information indicating a characteristic of the log information. The characteristic of an area can be exemplified by the types of shops included in the area. The information gathering server 120 classifies the log information according to each piece of terminal identification information, and determines a characteristic of the user of the communication terminal 110 based on the information indicating the characteristic attached to the log information.

Figure 4:
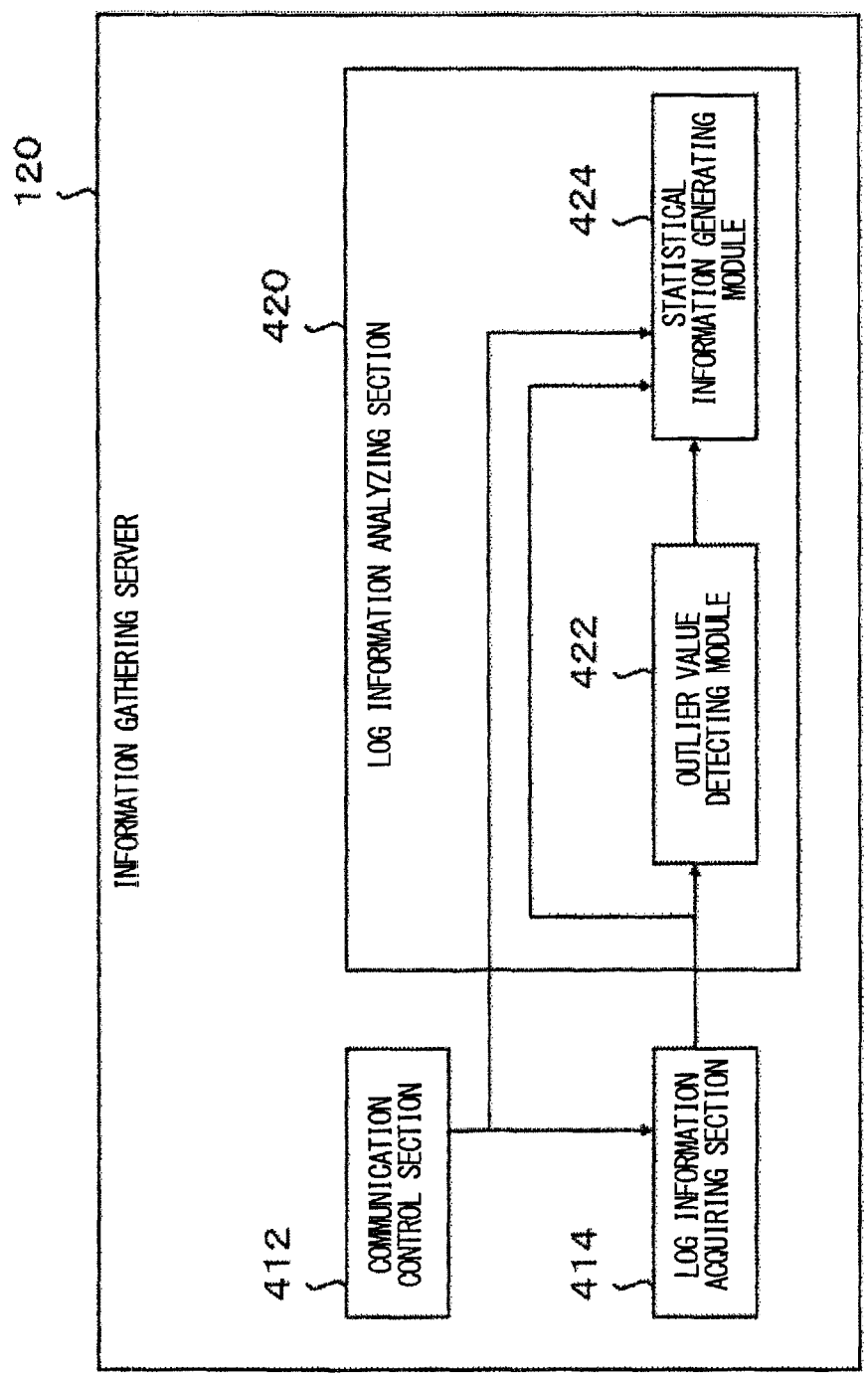
FIG. 4 is a schematic view of an exemplary information gathering server 120.

FIG. 4 is a schematic view of an exemplary function block configuration of the information gathering server 120. In the description relating to FIG. 4, portions identical to the description provided in relation to FIG. 1 may be omitted. In the present embodiment, the information gathering server 120 includes a communication control section 412, a log information acquiring section 414, and a log information analyzing section 420. The log information analyzing section 420 includes an outlier value detecting module 422 and a statistical information generating module 424. The statistical information generating module 424 is an example of a statistical information generating section.

Each component of the information gathering server 120 may be realized by hardware, by software, or by a combination of hardware and software. By executing a program, a computer may function as a portion of the information gathering server 120. The program may be stored on a computer readable medium, or may be stored in a storage apparatus connected to a network.

The program that is installed on the computer and causes the computer to function as a portion of the information gathering server 120 according to the present embodiment includes modules that define the operations of each component of the information gathering server 120. This program and these modules cause the CPU or the like to cause the computer to function as each component of the information gathering server 120 or cause the computer to perform an information processing method in the information gathering server 120. The information processes recorded in the program are read by the computer, thereby causing the computer to function as specific means utilizing cooperation between software and the various hardware resources of the information gathering server 120. The specific means can form the information gathering server 120 suitable for an intended use, by realizing computation and processing of information according to the intended use of the computer according to the present embodiment.

The communication control section 412 controls communication between the information gathering server 120 and the one or more communication terminals 110. The communication control section 412 may be a communication interface. The communication control section 412 transmits to the log information acquiring section 414 the log information received from the one or more communication terminals 110. The communication control section 412 may transmit to the statistical information generating module 424 the instructions from the user of the information gathering server 120. The log information acquiring section 414 acquires one or more pieces of log information from the one or more communication terminals 110. The log information acquiring section 414 transmits the acquired log information to at least one of the outlier value detecting module 422 and the statistical information generating module 424.

The log information analyzing section 420 analyzes the log information and generates information relating to the communication state for at least some of one or more positions. In the present embodiment, the log information analyzing section 420 generates statistical information relating to the communication environment at a position as the information relating to the communication state. The log information analyzing section 420 may generate the statistical information by using all of the log information acquired by the log information acquiring section 414, or may generate the statistical information while omitting from the log information acquired by the log information acquiring section 414 the pieces of log information indicating values that are skewed from the values indicated by other pieces of log information.

In the present embodiment, the log information analyzing section 420 generates the statistical information while distinguishing between log information indicating a communication environment that is indoors and log information indicating a communication environment that is outdoors. In another embodiment, the log information analyzing section 420 generates the statistical information while excluding the log information indicating a communication environment that is indoors from the log information acquired by the log information acquiring section 414.

The outlier value detecting module 422 receives one or more pieces of log information from the log information acquiring section 414. The outlier value detecting module 422 detects, as outlier values, the pieces of log information indicating values skewed from the values indicated by other pieces of log information from among the received pieces of log information. In this way, the accuracy of the analysis can be improved. The outlier value detecting module 422 may attach information indicating an outlier value to the pieces of log information detected as outlier values, and then transmit all of the log information received from the log information acquiring section 414 to the statistical information generating module 424. The outlier value detecting module 422 may transmit to the statistical information generating module 424 information obtained by removing the pieces of log information detected as outlier values from the log information received from the log information acquiring section 414.

The outlier value detecting module 422 may detect the outlier values based on an average value and a standard deviation of a target on which the outlier value detection is performed. For example, the outlier value detecting module 422 detects that there is an outlier value in a case where the value is not contained within a range that is a multiple of a standard deviation, e.g. two or three times the standard deviation, from the average value serving as the center. The outlier value detecting module 422 may detect the outlier values based on a comparison to a predetermined value. The outlier value detecting module 422 may determine the targets of the outlier value detection according to the content of the statistical processing performed by the statistical information generating module 424.

In one embodiment, when the position information, the communication environment information of the communication terminal, and the information relating to the GPS accuracy of the GPS information acquired by the communication terminal at the time when the position information is acquired are associated with each other in at least some of the one or more pieces of log information, the outlier value detecting module 422 detects a certain piece of log information as an outlier value in the manner shown below. First, the outlier value detecting module 422 determines whether the GPS accuracy is greater than a predetermined value for each piece of log information that includes GPS information. If the GPS accuracy is less than the predetermined value, then the outlier value detecting module 422 detects the log information including the information relating to this GPS accuracy to be an outlier value.

In the present embodiment, information in which the position information accuracy is less than a predetermined value can be excluded. As a result, the accuracy of the statistical information generated by the statistical information generating module 424 can be improved. Furthermore, in the present embodiment, the log information can be separated into log information obtained outdoors or at a window and log information obtained indoors. As a result, the statistical information generating module 424 can generate statistical information relating to each case.

The GPS accuracy is expressed using CEP (Circular Error Probability), for example. In a case where the GPS receiver has a 50% probability in a prescribed circle, the CEP is expressed as the radius of this circle. In a case where the GPS receiver is outdoors or at a location where the GPS signal can be easily received regardless of being indoors, e.g. a location at a window, the CEP is a small value. On the other hand, when the GPS receiver is at a location where the GPS signal is difficult to receive, e.g. a location indoors, the CEP is a large value.

A location where the GPS signal is easy to receive tends to be a location where radio waves for mobile communication or wireless communication are also easy to receive, and a location where the GPS signal is difficult to receive tends to be a location where radio waves for mobile communication or wireless communication are also difficult to receive. Therefore, by detecting the log information including information relating to GPS accuracy to be an outlier value when this GPS accuracy is greater than a predetermined value, the communication environment information acquired at a location where it is difficult to receive radio waves, e.g. a location indoors, can be detected as an outlier value. As a result, the statistical information generating module 424 can generate the statistical information by using primarily the communication environment information obtained at locations where it is easy to receive radio waves, e.g. at a window or outdoors. Based on the generated statistical information, the information gathering server 120 can provide information indicating the effectiveness in a case where a base station is installed outdoors, for example.

The outlier value detecting module 422 may detect log information including information relating to GPS accuracy to be an outlier value when this GPS accuracy is greater than a predetermined value. In this case, the statistical information generating module 424 can generate the statistical information by using the communication environment information that is primarily obtained at locations where it is difficult to receive radio waves, e.g. indoors. Based on the generated statistical information, the information gathering server 120 can provide information indicating the effectiveness in a case where a base station is installed indoors, for example.

In another embodiment, when the position information, the communication environment information of the communication terminal, information relating to the time at which the communication environment information of the communication terminal is acquired, and terminal identification information identifying each of one or more communication terminals 110 are associated with each other in at least some of the one or more pieces of log information, the outlier value detecting module 422 detects a certain piece of log information as an outlier value in the manner shown below. First, the outlier value detecting module 422 classifies the pieces of log information received from the log information acquiring section 414 according to each communication terminal 110 identified by the terminal identification information, based on the terminal identification information. Next, for each piece of log information classified according to the terminal identification information, the outlier value detecting module 422 determines movement speed of the communication terminal 110. After this, the outlier value detecting module 422 detects the outlier values based on the movement speeds of the communication terminals.

In the present embodiment, even if there is position information included in a piece of log information indicating a position that differs significantly from the position where the communication environment information was actually acquired due to some sort of error, it is possible to remove this information. As a result, the accuracy of the statistical information generated by the statistical information generating module 424 can be improved. Furthermore, with the present embodiment, it is possible to separate the log information according to the means of travel used by the user of the communication terminal 110, which can be exemplified by travel by foot, bicycle, automobile, railway, or high-speed railway. As a result, the statistical information generating module 424 can generate statistical information relating to each of these cases.

The outlier value detecting module 422 determines the movement speed of each communication terminal 110 in the manner shown below. Each piece of log information classified according to the terminal identification information includes information relating to the communication environment information acquisition time, and therefore the outlier value detecting module 422 can determine the movement speed of each communication terminal 110. Using the example in which log information is stored in the data table 300, the outlier value detecting module 422 determines the movement speed v of each communication terminal 110 at a position indicated by the log information stored in the second row of the data table 300, using Expression 1 shown below, for example.

$$v = dL/dt \qquad \text{Expression 1}$$

Here, dL represents the distance between the position indicated by the log information stored in the second row of the data table 300 and the position indicated by the log information stored in the first row of the data table 300. Furthermore, dt represents the time difference between the time indicated by the log information stored in the second row of the data table 300 and the time indicated by the log information stored in the first row of the data table 300.

The outlier value detecting module 422 can also determine the movement speed of the communication terminal 110 based on other pieces of log information stored in the data table 300, in the same manner. The outlier value detecting module 422 may attach information indicating the movement speed of the communication terminal 110 to the log information for which the movement speed of the communication terminal 110 has been determined.

For log information in a case where there is only one piece of log information corresponding to a certain piece of terminal identification information, or for log information that has the earliest communication environment information acquisition time among a plurality of pieces of log information classified according to the terminal identification information, the outlier value detecting module 422 cannot determine the movement speed of the communication terminal 110 using Expression 1 shown above. When it is impossible to determine the movement speed of the communication terminal 110 at the position indicated by a certain piece of log information, the outlier value detecting module 422 need not determine the movement speed of the communication terminal 110 at this position, and may determine the movement speed of the communication terminal 110 at this position based on the movement speed of the communication terminal 110 at a position indicated by another piece of log information. For example, the outlier value detecting module 422 determines that the movement speed of the communication terminal 110 at the position indicated by the log information stored in the first row of the data table 300 is the same as the movement speed of the communication terminal 110 at the position indicated by the log information stored in the second row of the data table 300.

The outlier value detecting module 422 detects outlier values based on the movement speed of the communication terminal 110 in the manner shown below, for example. When the movement speed of the communication terminal 110 is less than or equal to a first value, the outlier value detecting module 422 determines that the log information was acquired at a time when the user of the communication terminal 110 was moving according to a first movement means. The first value is 30-60 km/h, for example. The first movement means can be exemplified by walking or a bicycle. When the movement speed of the communication terminal 110 is greater than the first value, the communication terminal 110 determines that the user of the communication terminal 110 is moving according to a second movement means. The second movement means can be exemplified by an automobile, railway, or high-speed railway. When the movement speed of the communication terminal 110 is greater than a second value, the outlier value detecting module 422 detects that some error has occurred during acquisition of the position information, and detects this piece of log information as an outlier value. The second value is greater than the first value and is 120-350 km/h, for example.

In another embodiment, when the position information, the communication environment information of the communication terminal, and terminal identification information identifying each of one or more communication terminals 110 are associated with each other in at least some of the one or more pieces of log information, the outlier value detecting module 422 detects a certain piece of log information as an outlier value in the manner shown below. The log information is preferably further associated with information relating to the time at which the communication environment information of the communication terminal was acquired.

First, the outlier value detecting module 422 classifies the log information received from the log information acquiring section 414 according to each communication terminal 110 identified by the terminal identification information, based on the terminal identification information. If a group of pieces of log information classified according to the terminal identification information is composed only of pieces of log information indicating that communication is impossible, the outlier value detecting module 422 may detect this group of pieces of log information as being an outlier value.

If a predetermined number of pieces of log information indicating that communication is impossible are continuous in a group of pieces of log information classified according to the terminal identification information, the outlier value detecting module 422 may detect this group of pieces of log information as being an outlier value. The outlier value detecting module 422 may detect all of the one or more pieces of log information contained in a group of pieces of log information as being outlier values, or may detect only the pieces of log information indicating that communication is impossible that are arranged in a series containing at least the predetermined number of pieces of log information as outlier values, from among the one or more pieces of log information included in the group of pieces of log information.

The outlier value detecting module 422 may detect a group of pieces of log information to be an outlier value in a case where the pieces of log information indicating that communication is impossible contained in a group of pieces of log information classified according to the terminal identification information are continuous for a predetermined amount of time. The outlier value detecting module 422 may detect all of the one or more pieces of log information contained in a group of pieces of log information as being outlier values, or may detect only the pieces of log information indicating that communication is impossible that are continuous for at least the predetermined time as outlier values, from among the one or more pieces of log information included in the group of pieces of log information.

In yet another embodiment, the outlier value detecting module 422 may detect a piece of log information to be an outlier value in a case where the position indicated by the position information included in the log information is outside of a predetermined geographical range. For example, in a case where the statistical information generating module 424 generates statistical information within Japan and the position information included in the log information acquired from the log information acquiring section 414 indicates a position outside of Japan, the outlier value detecting module 422 may detect this log information to be an outlier value.

The statistical information generating module 424 receives the instructions form the user of the information gathering server 120 via the communication control section 412. The statistical information generating module 424 receives one or more pieces of log information from the log information acquiring section 414 or the outlier value detecting module 422. The statistical information generating module 424 may receive, from the outlier value detecting module 422, data obtained by removing the pieces of log information detected as outlier values by the outlier value detecting module 422 from the log information received from the communication terminal 110 by the log information acquiring section 414.

The statistical information generating module 424 generates the statistical information relating to the communication environment based on at least some of the one or more pieces of log information received from the log information acquiring section 414 or the outlier value detecting module 422. The statistical information generating module 424 may generate the statistical information relating to the communication environment at a position. The statistical information relating to the communication environment at a position may be statistical information of a communication environment in an area or at a position designated by the user of the information gathering server 120.

For example, the statistical information generating module 424 can generate the statistical information of a communication environment within Japan by using the communication environment information included in each of the one or more pieces of log information to calculate a statistical value of the communication environment information for each Japanese communication carrier. Furthermore, the statistical information generating module 424 can generate the statistical information in a case where a roaming service is used outside of Japan, by using the communication environment information included in each of the one or more pieces of log information to calculate a statistical value of the communication environment information outside of Japan for each Japanese communication carrier.

The statistical information generating module 424 may generate the statistical information relating to position for each item forming the communication environment information. The statistical information generating module 424 may generate the statistical information relating to position for at least one of the items forming the communication environment information. The statistical information generating module 424 may determine which items the statistical information is to be generated for, according to instructions form the user of the information gathering server 120. The items forming the communication environment information include the communication possibility, radio wave state, communication quality, communication method, and communication carrier, for example.

In a case where an item forming the communication environment information can be expressed as a numerical value, the statistical information generating module 424 may generate at least one of an arithmetic mean value, a median value, a most frequent value, a maximum value, and a minimum value of the item, as the statistical information. The statistical information generating module 424 may generate information indicating the amount of data variation, e.g. the spread or standard deviation, as the statistical information. In this way, it is possible to provide information indicating the stability of the communication environment.

In a case where an item forming the communication environment information cannot be expressed as a numerical value, the statistical information generating module 424 may generate a ratio of the number of pieces of log information indicating prescribed information for the item to the total number of pieces of log information for which the statistical information is to be generated, as the statistical information. For example, in a case where the item for which the statistical information is to be generated is the communication possibility, this item cannot be expressed as a numerical value, and is expressed as information indicating that communication is possible or information indicating that communication is impossible. In this case, the statistical information generating module 424 generates the ratio of the number of pieces of log information indicating that communication is possible to the total number of pieces of log information for which the statistical information is to be generated (sometimes referred to as the "connection rate"), for example, as the statistical information.

The statistical information generating module 424 may generate information relating to change over time of the communication environment in a certain area or at a certain position, as the statistical information, based on the log information in which the position information, the information relating to the communication environment of the communication terminal 110 at this position, and the information relating to the time at which the information relating to the communication environment of the communication terminal 110 is acquired are associated with each other. For example, the statistical information generating module 424 generates information relating to the increase or decrease of pieces of log information indicating that communication is impossible or that communication is possible before and after a certain time, for an area near a certain position. This certain position is a position where a base station is newly installed, and this certain time is the time at which the base station is installed, for example. In this way, it is possible to provide information indicating an improving trend of the communication environment, for example.

The statistical information generating module 424 may classify the positions or areas that are targets of the statistical processing into a plurality of categories, based on the statistical information values. Furthermore, the statistical information generating module 424 may determine the display method according to the statistical information values. The display method can be exemplified by the shape, color, or type of icon displayed when the statistical information is output to a display apparatus such as a display.

As an example, when generating information relating to the increase or decrease of pieces of log information indicating that communication is possible or that communication is impossible before and after a certain time, the statistical information generating module 424 may classify the positions or areas that are the targets of the statistical processing into three categories that include areas in which the number of pieces of log information indicating that communication is impossible decreases, areas in which the number of pieces of log information indicating that communication is impossible increases, and areas in which the number of pieces of log information indicating that communication is impossible does not change, according to the increasing and decreasing width of the pieces of log information indicating that communication is impossible. When displaying the statistical information on a geographical map, the statistical information generating module 424 may display the areas in which the number of pieces of log information indicating that communication is impossible decreases in red, display the areas in which the number of pieces of log information indicating that communication is impossible increases in blue, and display the areas in which the number of pieces of log information indicating that communication is impossible does not change in yellow.

The statistical information generating module 424 may classify the one or more pieces of log information received from the log information acquiring section 414 or the outlier value detecting module 422 into one or more groups, and generate the statistical information for each of the one or more groups or for certain groups among the one or more groups based on the pieces of log information contained in each of the one or more groups or in the certain groups. The statistical information generating module 424 may classify the one or more pieces of log information into one or more groups based on at least one piece of information contained in the log information. The statistical information generating module 424 may determine the specific groups for which the statistical information is to be generated, according to instructions from the user of the information gathering server 120.

The statistical information generating module 424 may determine representative values that represent the groups based on the pieces of log information contained in each of the one or more groups or in certain groups among the one or more groups, and generate the statistical information based on the representative values. For example, in a case where the communication environment information for generating the statistical information can be expressed as a numerical value, the statistical information generating module 424 generates at least one of an arithmetic mean value, a median value, a most frequent value, a maximum value, and a minimum value of the communication environment information, as the representative value. In a case where the communication environment information for generating the statistical information cannot be expressed as a numerical value, the statistical information generating module 424 determines the representative value according to predetermined rules.

For example, when determining the representative value of information relating to the communication possibility of a certain group, the statistical information generating module 424 determines, for each piece of log information included in the group for which the representative value is being determined, whether the piece of log information includes information indicating that communication is impossible. If there is even one piece of log information that includes information indicating that communication is impossible among the pieces of log information included in the group for which the representative value is being determined, the statistical information generating module 424 selects information indicating that communication is impossible as the representative value of the information relating to the communication possibility for this group. If there are no pieces of log information that include information indicating that communication is impossible among the pieces of log information included in the group for which the representative value is being determined, the statistical information generating module 424 selects information indicating that communication is possible as the representative value of the information relating to the communication possibility for this group.

In one embodiment, the statistical information generating module 424 classifies the one or more pieces of log information into one or more groups based on the position indicated by the position information included in each of the one or more pieces of log information. The statistical information generating module 424 may classify the pieces of log information such that pieces of log information in which positions indicated by the pieces of position information are the same or pieces of log information in which the positions indicated by the pieces of position information are included in the same area are classified in the same group.

The statistical information generating module 424 generates the statistical information relating to the communication environment for each of the groups classified in the manner described above or for certain groups among the groups classified in the manner described above. In this way, it is possible to provide information indicating the geographical distribution of the information relating to the communication environment. For example, the statistical information generating module 424 can provide a geographical distribution of the connection rate by generating the connection rate of a certain position or area based on the information relating to the communication possibility in the log information classified for this certain position or area.

In another embodiment, the statistical information generating module 424 classifies one or more pieces of log information into one or more groups based on the position information indicating the position of the communication terminal 110, the acquisition time information relating to the time at which the information relating to the communication environment of the communication terminal 110 is acquired, and the terminal identification information for identifying the communication terminal 110 included in each of the one or more pieces of log information. More specifically, first, the statistical information generating module 424 classifies the pieces of log information that are the target of the statistical processing into one or more groups based on the terminal identification information included in each piece of log information that is a target of the statistical processing. Next, the statistical information generating module 424 classifies the pieces of log information included in the one or more groups classified according to the terminal identification information into one or more groups formed from one or more pieces of log information that are temporally continuous, based on whether the communication terminal 110 was moving at the time when the position information and the communication environment information were acquired. The statistical information generating module 424 may determine whether the communication terminal 110 was moving at the time when the position information and the communication environment information included in a certain piece of log information were acquired, based on the position information and the acquisition time information of this piece of log information.

The statistical information generating module 424 generates the statistical information relating to the communication environment for each of the groups classified in the manner described above or for certain groups among the groups classified in the manner described above. The statistical information generating module 424 may determine a representative value that represents the group for at least some of the groups classified in the manner described above, and may generate the statistical information based on the representative value. The statistical information generating module 424 may generate the statistical information by using the representative value of the communication environment information for some of the groups and using the communication environment information of the log information included in other groups.

In particular, the statistical information generating module 424 preferably determines the representative value that represents the group for a group formed from pieces of log information that indicate the communication terminal 110 was not moving at the time when the position information and the communication environment information were acquired. In a case where the communication terminal 110 is not moving, the number of pieces of log information per unit time varies greatly depending on the OS of the communication terminal 110. For example, in a case where the OS of the communication terminal 110 is an OS that does not limit the operation of a program when the program is in a background state, the number of pieces of log information per unit time is larger than in a case where the OS of the communication terminal 110 is an OS that limits the operation of a program when the program is in the background state.

When it is determined that the communication terminal 110 is not moving, the communication terminal 110 can be treated as being static or used at a certain position or in a certain area. The certain position or area can be exemplified by the home or the office. It is often the case that the user of the communication terminal 110 has a communication terminal that has a favorable communication environment at home or the office, for example, and there is a high probability that the program for acquiring the communication environment information is in the background state when at home or the office. Therefore, there is a possibility that differences in the OS of the communication terminal 110 will affect the accuracy of the statistical information generated by the statistical information generating module 424. However, it is possible to restrict the effect of differences in the OS of the communication terminal 110 on the accuracy of the statistical information, by determining the representative value that represents the group for a group formed from pieces of log information in which the communication terminal 110 was not moving when the position information and the communication environment information were acquired, and using this representative value to generate the statistical information.

In another embodiment, the statistical information generating module 424 classifies one or more pieces of log information into one or more groups based on the GPS information included in the pieces of log information. More specifically, the statistical information generating module 424 determines whether the GPS accuracy included in one or more pieces of log information that are the target for the statistical processing is greater than a predetermined value, for example, and classifies the one or more pieces of log information into two groups that include a group of pieces of log information for which the GPS accuracy is less than or equal to the predetermined value and a group of pieces of log information for which the GPS accuracy is greater than the predetermined value.

In this way, one or more pieces of log information can be classified as pieces of log information indicating a communication environment that is indoors and pieces of log information indicating a communication environment that is outdoors. The statistical information generating module 424 generates the statistical information relating to the communication environment for each of the groups classified in the manner described above or for certain groups among the groups classified in the manner described above.

In another embodiment, the statistical information generating module 424 classifies one or more pieces of log information into one or more groups based on the information indicating the communication method used when acquiring the information relating to the communication environment included in the pieces of log information. The statistical information generating module 424 generates the statistical information relating to the communication environment for each of the groups classified in the manner described above or for certain groups among the groups classified in the manner described above.

In recent years, communication terminals 110 have been adapted for not only mobile communication methods such as 3G, 4G, and LTE, but also for wireless LAN methods such as WiFi (Registered Trademark) and wireless MAN methods such as WiMAX (Registered Trademark). However, by classifying one or more pieces of log information according to the communication method, it is possible to generate the statistical information relating to the communication environment for each mobile communication method such as 3G, 4G, and LTE.

In a case where a certain piece of log information does not include information indicating the communication method used when acquiring the information relating to the communication environment, the statistical information generating module 424 may determine the communication method based on other information contained in this piece of log information. For example, in a case where a piece of log information includes information relating to network latency as the communication environment information, the statistical information generating module 424 determines the communication method used when the information relating to the latency was acquired, based on the information relating to the latency included in the log information.

In a case where the information related to the communication environment and the information for identifying the model of the communication terminal 110 used when acquiring the information relating to the communication environment are also associated with each other in the log information, the statistical information generating module 424 uses the information for identifying the model of the communication terminal 110 to acquire the information of the communication method corresponding to each model of the communication terminal 110, and may select the communication method used when acquiring the information relating to the communication environment from among communication methods corresponding to the model of the communication terminal 110, based on the information relating to the latency included in the log information. In this way, it is possible to accurately determine the communication method.

Figure 5:
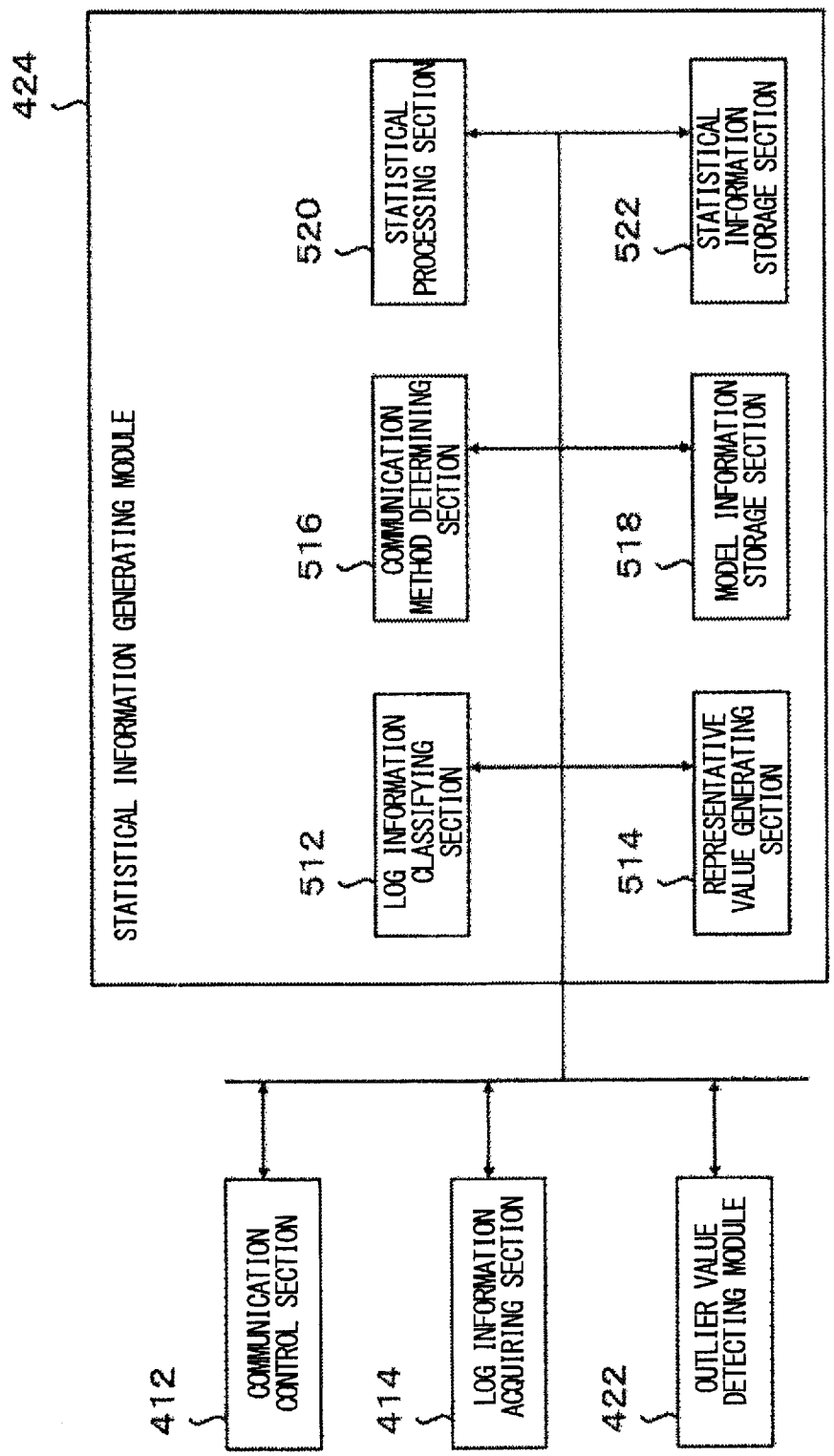
FIG. 5 is a schematic view of an exemplary statistical information generating module 424.

FIG. 5 is a schematic view of an exemplary function block configuration of the statistical information generating module 424. In the present embodiment, the statistical information generating module 424 includes a log information classifying section 512, a representative value generating section 514, a communication method determining section 516, a model information storage section 518, a statistical processing section 520, and a statistical information storage section 522. The statistical processing section 520 is an example of a statistical information generating section.

The log information classifying section 512 receives one or more pieces of log information from the log information acquiring section 414 or the outlier value detecting module 422. The log information classifying section 512 classifies the received one or more pieces of log information into one or more groups, based on the position information and the acquisition time information included in each of the one or more pieces of log information.

In one embodiment, the log information classifying section 512 classifies the one or more pieces of log information into the one or more groups based on the position indicated by the position information included in each of the one or more pieces of log information. The log information classifying section 512 may classify the pieces of log information such that pieces of log information in which positions indicated by the pieces of position information are the same or pieces of log information in which the positions indicated by the pieces of position information are included in the same area are classified in the same group.

In another embodiment, the log information classifying section 512 classifies the one or more pieces of log information into the one or more groups based on the position information indicating the position of the communication terminal 110, the acquisition time information relating to the time at which the information relating to the communication environment of the communication terminal 110 was acquired, and the terminal identification information for identifying the communication terminal 110 included in each of the received one or more pieces of log information. More specifically, the log information classifying section 512 classifies the received one or more pieces of log information into the one or more groups in the manner described below.

First, the log information classifying section 512 arranges the received one or more pieces of log information according to the time displayed by the acquisition time information included in each piece of the received one or more pieces of log information. Next, the log information classifying section 512 classifies the one or more pieces of log information according to the terminal identification information based on the terminal identification information included in each of the one or more pieces of log information. After this, the log information classifying section 512 classifies the pieces of log information contained in each of the one or more groups classified according to the terminal identification information into one or more groups formed from one or more pieces of log information that are temporally continuous, based on whether the communication terminal 110 was moving at the time when the position information and the communication environment information were acquired.

For example, in a case where the terminal identification information is acquired every two days, the log information classifying section 512 classifies the pieces of log information that are targets of the statistical processing into groups of one day's worth of pieces of log information for each communication terminal 110, by classifying the pieces of log information that are targets of the statistical processing according to the terminal identification information. Next, the log information classifying section 512 determines, for each piece of log information in the one day's worth of log information for each communication terminal 110, whether the communication terminal 110 was moving at the time when the position information and the communication environment information were acquired, based on the position information and the acquisition time information included in the log information. The log information classifying section 512 may determine whether the communication terminal 110 was moving at the time when the position information and the communication environment information included in a certain piece of log information were acquired based on the position information and the acquisition time information of this piece of log information.

Next, the log information classifying section 512 further classifies each of the one or more groups classified according to each communication terminal 110 into one or more groups, according to whether the communication terminal 110 was moving. For example, the log information classifying section 512 classifies the pieces of log information into six groups that include (1) log information acquired during a period from when the user of the communication terminal 110 returns home to when the user leaves home the next morning, (2) log information acquired during a period from when the user of the communication terminal 110 leaves home to when the user arrives at the workplace, (3) log information acquired in a period during which the user of the communication terminal 110 is working at the workplace, (4) log information acquired during a period when the user of the communication terminal 110 is out of the workplace for lunch, (5) log information acquired during a period when the user of the communication terminal 110 is working at the workplace after finishing lunch, and (6) log information acquired in a period from when the user of the communication terminal 110 leaves the workplace to when the user arrives at home.

In another embodiment, the log information classifying section 512 classifies the one or more pieces of log information into the one or more groups based on the GPS information included in the log information. More specifically, the log information classifying section 512 determines whether the GPS accuracy included in each of one or more pieces of log information that are targets of the statistical process is greater than a predetermined value, for example, and classifies the one or more pieces of log information into two groups that include a group of pieces of log information for which the GPS accuracy is less than or equal to the predetermined value and a group of pieces of log information for which the GPS accuracy is greater than the predetermined value.

In another embodiment, the log information classifying section 512 classifies the one or more pieces of log information into the one or more groups based on the information indicating the communication method used when acquiring the information relating to the communication environment that is included in the log information. The log information classifying section 512 may transmit to the communication method determining section 516 the pieces of log information that do not include information relating to the communication method.

The representative value generating section 514 generates a representative value that represents information relating to the communication environment for each of the one or more groups classified by the log information classifying section 512 or for certain groups among the groups classified by the log information classifying section 512, based on the pieces of log information included in each of the one or more groups or certain groups among the one or more groups. The representative value generating section 514 may determine the certain groups for which the representative value is to be generated, according to instructions from the user of the information gathering server 120.

In a case where the communication environment information for generating the statistical information can be expressed as a numerical value, the representative value generating section 514 may generate at least one of an arithmetic mean value, a median value, a most frequent value, a maximum value, and a minimum value of the communication environment information, as the representative value. In a case where the communication environment information for generating the statistical information cannot be expressed as a numerical value, the representative value generating section 514 may determine the representative value according to predetermined rules.

As an example of such a predetermined rule, the representative value generating section 514 determines a ratio of the number of pieces of log information indicating prescribed information included in a certain group to the number of pieces of log information for which the communication environment information for generating the statistical information indicates certain information, as the representative value. As another example of such a predetermined rule, if there is even one piece of log for which the communication environment information for generating the statistical information indicates certain information among the pieces of log information included in a certain group, the representative value generating section 514 sets this certain information as the representative value.

The communication method determining section 516 receives one or more pieces of log information from the log information acquiring section 414, the outlier value detecting module 422, or the log information classifying section 512. In a case where the received one or more pieces of log information contain a piece of log information that does not include information relating to the communication method used when acquiring the information relating to the communication environment, the communication method determining section 516 determines this communication method. The communication method determining section 516 may determine whether to determine the communication method in the above manner, according to instructions form the user of the information gathering server 120.

In a case where a piece of log information that does not include information relating to the communication method includes information relating to network latency, the communication method determining section 516 may determine the communication method based on the information relating to the latency. For example, when the latency is less than a predetermined value, the communication method determining section 516 determines that the communication method used when acquiring the information relating to the communication environment is a first communication method, e.g. LTE or 4G. On the other hand, when the latency is greater than or equal to the predetermined value, the communication method determining section 516 determines that the communication method used when acquiring the information relating to the communication environment is a second communication method, e.g. 3G.

In a case where the log information that does not include information relating to the communication method includes information relating to the network latency and information for identifying the model of the communication terminal 110 used when acquiring the information relating to the communication environment, the communication method determining section 516 may determine the communication method used when acquiring the information relating to the communication environment in the manner described below. First, the communication method determining section 516 references the model information storage section 518 and extracts the communication method corresponding to the communication terminal 110 used when acquiring the information relating to the communication environment, based on the information for identifying the model of the communication terminal included in the log information. Next, the communication method determining section 516 determines the communication method used when acquiring the information relating to the communication environment, based on the information relating to the latency and the extracted communication method.

For example, in a case where the communication terminal is identified as being compatible with both 3G and LTE based on the model identification information of the communication terminal 110 included in a piece of log information, the communication method determining section 516 determines that the communication method used when acquiring the information relating to the communication environment is LTE if the latency is less than the predetermined value. On the other hand, in a case where the latency is greater than or equal to the predetermined value, the communication method user when acquiring the information relating to the communication environment is determined to be 3G. Furthermore, in a case where the communication terminal is identified as being compatible with only 3G based on the model identification information of the communication terminal 110 included in a piece of log information, the communication method determining section 516 determines that the communication method used when acquiring the information relating to the communication environment is 3G.

The model information storage section 518 stores one or more pieces of model identification information for identifying the model of each communication terminal and a communication method compatible with the model of the communication terminal identified by the one or more pieces of model identification information, in association with each other. The model information storage section 518 receives information for identifying the model of the communication terminal from the communication method determining section 516. The model information storage section 518 compares the information for identifying the model of the communication terminal to the model identification information stored in the communication method determining section 516. The model information storage section 518 extracts the communication method corresponding to the model information that matches the information for identifying the model of the communication terminal. The model information storage section 518 transmits the extracted communication method to the communication method determining section 516.

The statistical processing section 520 receives parent set information for generating the statistical information from the log information acquiring section 414, the outlier value detecting module 422, the log information classifying section 512, the representative value generating section 514, or the communication method determining section 516. The statistical processing section 520 receives instructions from the user of the information gathering server 120 via the communication control section 412.

The statistical processing section 520 may generate the statistical information relating to the communication environment at a position based on the representative value of each of the one or more groups classified by the log information classifying section 512. The statistical processing section 520 may generate the statistical information by using the representative values of the communication environment information in some of the groups and the communication environment information of the log information included in other groups.

The statistical processing section 520 generates the statistical information according to instructions from the user of the information gathering server 120. The statistical processing section 520 may determine the items for which the statistical information is to be generated according to instructions from the user of the information gathering server 120. For example, the statistical processing section 520 generates the statistical information relating to the communication environment at a position for a communication method designated by the user of the information gathering server 120, based on the representative value of each of one or more groups.

In a case where an item forming the communication environment information can be expressed as a numerical value, the statistical processing section 520 may generate at least one of an arithmetic mean value, a median value, a most frequent value, a maximum value, and a minimum value of the item, as the statistical information. The statistical processing section 520 may generate information indicating the amount of data variation, e.g. the spread or standard deviation, as the statistical information.

In a case where an item forming the communication environment information cannot be expressed as a numerical value, the statistical processing section 520 may generate a ratio of the number of pieces of log information indicating prescribed information for the item to the total number of pieces of log information for which the statistical information is to be generated, as the statistical information. For example, in a case where communication possibility is the item for which the statistical information is to be generated, this item cannot be expressed numerically and is instead represented by information indicating that communication is possible or information indicating that communication is impossible. In this case, the statistical processing section 520 generates the ratio of the number of pieces of log information indicating that communication is possible to the total number of pieces of log information for which the statistical information is to be generated, for example, as the statistical information.

The statistical processing section 520 stores the generated statistical information in the statistical information storage section 522. The statistical processing section 520 may store the generated statistical information and information relating to the display method for this statistical information in association with each other. The information relating to the display method can be exemplified by the shape, color, or type of icon displayed when the statistical information is output to a display apparatus such as a display. The statistical information storage section 522 stores the information received from the statistical processing section 520.

FIG. 6 is a schematic view of an exemplary data table 600 stored in the model information storage section 518. The data table 600 stores a model name 610 and a corresponding communication method 620 in association with each other. The model name 610 is an example of model identification information.

As shown in FIGS. 5 and 6, in the present embodiment, the statistical information generating module 424 includes a log information classifying section 512. In this way, it is possible to sub-divide the targets for which the statistical information is to be generated. Furthermore, it is possible to restrict the effect of the OS or model of the communication terminal 110 on the statistical information.

In the present embodiment, the statistical information generating module 424 includes the communication method determining section 516. Depending on the OS of the communication terminal 110, the program for acquiring the communication environment information might not be able to acquire the information for identifying the communication method used when acquiring the communication environment information. However, the communication method determining section 516 can determine the communication method used when acquiring the communication environment information based on other information included in the log information. Therefore, it is possible to sub-divide the targets for which the statistical information is to be generated. Furthermore, it is possible to restrict the effect of the model or OS of the communication terminal 110 on the statistical information.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

LIST OF REFERENCE NUMERALS

10: communication network, 20: information providing server, 100: communication state analyzing system, 110: communication terminal, 120: information gathering server, 212: input section, 214: process executing section, 216: environment information acquiring section, 218: position information acquiring section, 222: output section, 224: identification information acquiring section, 226: log information generating section, 228: communication control section, 300: data table, 310: terminal ID, 320: date and time, 330: position information, 340: GPS accuracy, 350: communication environment information, 352: communication possibility, 354: throughput, 356: latency, 358: communication method, 360: terminal information, 362: model name, 364: OS information, 412: communication control section, 414: log information acquiring section, 420: log information analyzing section, 422: outlier value detecting module, 424: statistical information generating module, 512: log information classifying section, 514: representative value generating section, 516: communication method determining section, 518: model information storage section, 520: statistical processing section, 522: statistical information storage section, 600: data table, 610: model name, 620: communication method

What is claimed is:

1. An information processing apparatus comprising:
   a communication interface by which information is sent to and received from a communication terminal over a network;
   a log information acquiring section that acquires, from the communication terminal via the communication interface, one or more pieces of log information associating position information identifying a position with information relating to a communication environment of the communication terminal at the position;
   a statistical information generating section that generates statistical information relating to the communication environment at a position, based on the one or more pieces of log information; and
   an outlier value detecting section that detects an outlier value among the one or more pieces of log information, wherein
   the statistical information generating section generates the statistical information based on the one or more pieces of log information excluding the outlier value detected by the outlier value detecting section.

2. The information processing apparatus according to claim 1, wherein
   at least some of the one or more pieces of log information associates the position information, the information relating to the communication environment of the communication terminal, and information relating to GPS accuracy of GPS information acquired by the communication terminal at a time when the position information was acquired, and
   the outlier value detecting section determines, for each of the pieces of log information including the information relating to the GPS accuracy, whether the GPS accuracy is greater than a predetermined value and detects the outlier value based on the determination.

3. The information processing apparatus according to claim 1, wherein
   at least some of the one or more pieces of log information associates the position information, the information relating to the communication environment of the communication terminal, information relating to a time at which the information relating to the communication environment of the communication terminal was acquired, and terminal identification information identifying the communication terminal, and
   the outlier value detecting section determines, for each of the pieces of log information including the information relating to the time and the terminal identification information, a movement speed of the communication terminal based on the position information and the information relating to the time, and detects the outlier value based on the determination.

4. An information processing apparatus comprising:
   a communication interface by which information is sent to and received from a communication terminal over a network;
   a log information acquiring section that acquires, from the communication terminal via the communication interface, one or more pieces of log information associating position information identifying a position with information relating to a communication environment of the communication terminal at the position; and
   a statistical information generating section that generates statistical information relating to the communication environment at a position, based on the one or more pieces of log information, wherein
   at least some of the one or more pieces of log information associates the position information, the information relating to the communication environment of the communication terminal, and information relating to a time at which the information relating to the communication environment of the communication terminal was acquired, and
   the statistical information generating section generates information relating to a change in the communication environment over time at at least some of the one or more positions.

5. An information processing apparatus comprising:
   a communication interface by which information is sent to and received from a communication terminal over a network;

a log information acquiring section that acquires, from the communication terminal via the communication interface, one or more pieces of log information associating position information identifying a position with information relating to a communication environment of the communication terminal at the position; and a statistical information generating section that generates statistical information relating to the communication environment at a position, based on the one or more pieces of log information, wherein the statistical information generating section classifies the one or more pieces of log information into one or more groups, based on the position information included in each of the one or more pieces of log information, and generates statistical information relating to the communication environment at a position for each of the one or more groups.

6. The information processing apparatus according to claim 1, wherein information is sent to and received from a plurality of communication terminals over the network by the communication interface, and the log information acquiring section acquires the one or more pieces of log information from the plurality of communication terminals via the communication interface.

7. The information processing apparatus according to claim 1, wherein the one or more pieces of log information associates the position information, the information relating to the communication environment of the communication terminal, acquisition time information relating to a time at which the information relating to the communication environment was acquired, and terminal identification information identifying the communication terminal, the information processing apparatus further comprises:

a log information classifying section that classifies the one or more pieces of log information into one or more groups, based on the position information and the acquisition time information included in each of the one or more pieces of log information; and a representative value generating section that, for each of the one or more groups, generates a representative value that represents information relating to the communication environment of the group, based on the log information classified in the group, and the statistical information generating section generates the statistical information relating to the communication environment at a position, based on the representative value of at least one of the one or more groups.

8. The information processing apparatus according to claim 7, wherein the information relating to the communication environment included in each of the one or more pieces of log information includes information relating to latency of the network, the information processing apparatus further comprises a communication method determining section that determines, for each of the one or more pieces of log information, what communication method was used when the information relating to the communication environment was acquired, based on the information relating to the latency, and the statistical information generating section generates the statistical information for a communication method designated by a user of the information processing apparatus.

9. The information processing apparatus according to claim 1, wherein the information relating to the communication environment includes information relating to latency of the network, the information processing apparatus further comprises a communication method determining section that determines, for each of the one or more pieces of log information, what communication method was used when the information relating to the communication environment was acquired, based on the information relating to the latency, and the statistical information generating section generates the statistical information relating to the communication environment at a position for a communication method designated by a user of the information processing apparatus, based on the one or more pieces of log information.

10. The information processing apparatus according to claim 9, further comprising:

a model information storage section that stores one or more pieces of model identification information for identifying the model of a communication terminal in association with a communication method that is compatible with a communication terminal of the model identified by the one or more pieces of model identification information, wherein the one or more pieces of log information further associates the information relating to the communication environment with information for identifying the model of the communication terminal used when the information relating to the communication environment was acquired, and, for each of the one or more pieces of log information, the communication method determining section references the model information storage section, extracts the communication method compatible with the communication terminal used when the information relating to the communication environment was acquired, based on the information for identifying the model of the communication terminal included in the log information, and determines what communication method was used when the information relating to the communication environment was acquired, based on the extracted communication method and the information relating to the latency.

11. A non-transitory computer-readable medium storing therein a program that causes a computer to function as the information processing apparatus according to claim 1.

12. A non-transitory computer-readable medium storing therein a program that causes a computer to function as the information processing apparatus according to claim 7.

13. A non-transitory computer-readable medium storing therein a program that causes a computer to function as the information processing apparatus according to claim 9.

14. The information processing apparatus according to claim 1, wherein the outlier value detecting section (i) determines whether information indicating a determination that communication is impossible is included in the one or more pieces of log information continuously for more than or equal to a predetermined number of pieces of log information and detects, as the outlier value, at least a portion of the one or more pieces of log information in which the information indicating the determination that communication is impossible is included in the one or more pieces of log information continuously for more than or equal to the predetermined number of pieces of log information, or (ii) determines whether information indicating a determination that communication is impossible is included in the one or more pieces of log information continuously for more than or equal to a predetermined amount of time and detects, as the outlier value, at least a portion of the one or more pieces of log information in which the information indicating the determination that communication is impossible is included in the one or more pieces of log information continuously for more than or equal to the predetermined amount of time.

15. The information processing apparatus according to claim 4, wherein
information is sent to and received from a plurality of communication terminals over the network by the communication interface, and
the log information acquiring section acquires the one or more pieces of log information from the plurality of communication terminals via the communication interface.

16. The information processing apparatus according to claim 4, wherein
the one or more pieces of log information associates the position information, the information relating to a communication environment of the communication terminal, the information relating to a time at which the information relating to the communication environment was acquired, and terminal identification information identifying the communication terminal,
the information processing apparatus further comprises:
a log information classifying section that classifies the one or more pieces of log information into one or more groups, based on the position information and the acquisition time information included in each of the one or more pieces of log information; and
a representative value generating section that, for each of the one or more groups, generates a representative value that represents information relating to the communication environment of the group, based on the log information classified in the group, and
the statistical information generating section generates the statistical information relating to the communication environment at a position, based on the representative value of at least one of the one or more groups.

17. The information processing apparatus according to claim 4, wherein
the information relating to the communication environment includes information relating to latency of the network,
the information processing apparatus further comprises a communication method determining section that determines, for each of the one or more pieces of log information, what communication method was used when the information relating to the communication environment was acquired, based on the information relating to the latency, and
the statistical information generating section generates the statistical information relating to the communication environment at a position for a communication method designated by a user of the information processing apparatus, based on the one or more pieces of log information.

18. The information processing apparatus according to claim 5, wherein
information is sent to and received from a plurality of communication terminals over the network by the communication interface, and
the log information acquiring section acquires the one or more pieces of log information from the plurality of communication terminals via the communication interface.

19. The information processing apparatus according to claim 5, wherein
the one or more pieces of log information associates the position information, the information relating to the communication environment of the communication terminal, acquisition time information relating to a time at which the information relating to the communication environment was acquired, and terminal identification information identifying the communication terminal,
the information processing apparatus further comprises:
a log information classifying section that classifies the one or more pieces of log information into one or more groups, based on the position information and the acquisition time information included in each of the one or more pieces of log information; and
a representative value generating section that, for each of the one or more groups, generates a representative value that represents information relating to the communication environment of the group, based on the log information classified in the group, and
the statistical information generating section generates the statistical information relating to the communication environment at a position, based on the representative value of at least one of the one or more groups.

20. The information processing apparatus according to claim 5, wherein
the information relating to the communication environment includes information relating to latency of the network,
the information processing apparatus further comprises a communication method determining section that determines, for each of the one or more pieces of log information, what communication method was used when the information relating to the communication environment was acquired, based on the information relating to the latency, and
the statistical information generating section generates the statistical information relating to the communication environment at a position for a communication method designated by a user of the information processing apparatus, based on the one or more pieces of log information.

* * * * *